E. E. WINKLEY.
MACHINE FOR MOLDING HEEL PILES.
APPLICATION FILED MAR. 19, 1917.

1,396,802.

Patented Nov. 15, 1921.
7 SHEETS—SHEET 6.

Witness
Helford A. Wait

Inventor
Erastus E. Winkley
by his attorneys
VanEvern, Fish & Hildreth

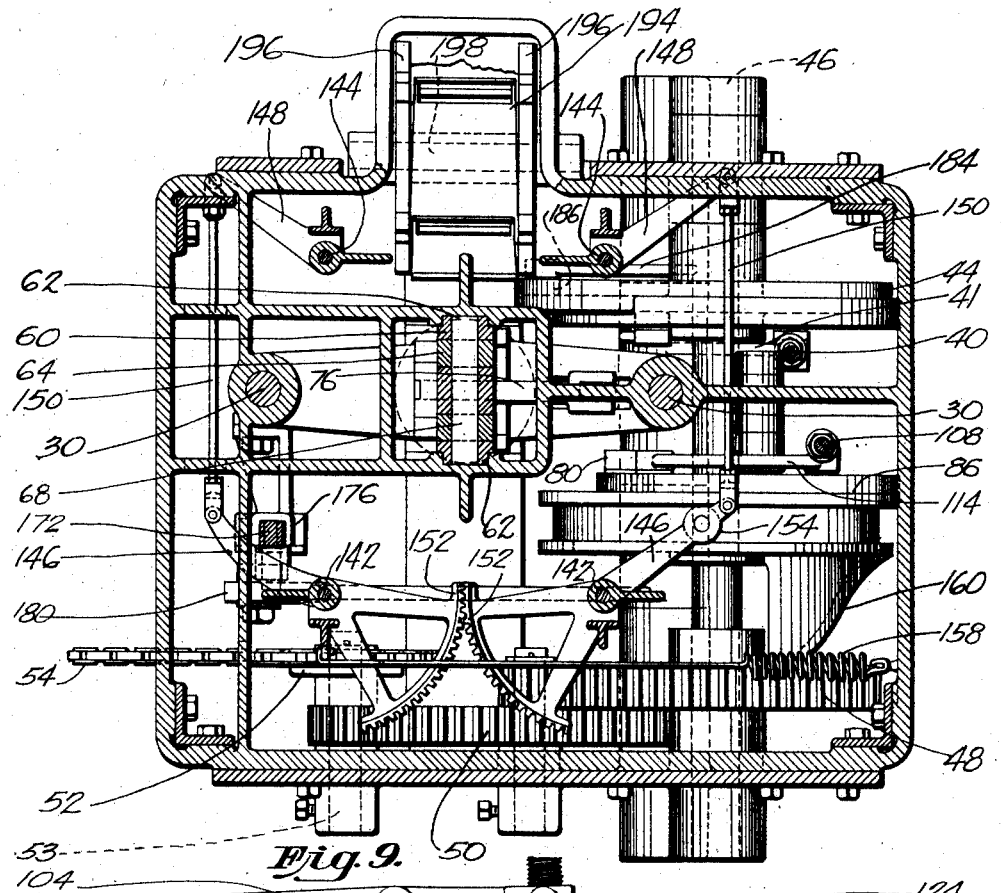

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR MOLDING HEEL-PILES.

1,396,802.      Specification of Letters Patent.      Patented Nov. 15, 1921.

Application filed March 19, 1917. Serial No. 155,902.

*To all whom it may concern:*

Be it known that I, ERASTUS E. WINKLEY, a citizen of the United States, residing at Lynn, in the county of Essex and State of Massachusetts, have invented certain new and useful Improvements in Machines for Molding Heel-Piles; and I do hereby declare the following to be a full, clear, and exact description of the invention, such as will enable others skilled in the art to which it appertains, to make and use the same.

In the manufacture of heels it is usual to apply paste or cement to heel-lifts, and then to assemble them in a pile having lifts of sufficient aggregate thickness to form a heel of the required height. After the lifts have been so assembled the pile is subjected to pressure, in some manner, for the purpose of bringing the lifts into close contact with each other.

The present invention relates to a machine for molding a heel-pile formed as just described, and one object of the invention is to produce a machine having means for automatically introducing the heel-piles into and removing them from the molding instrumentalities. Another object of the invention is to produce a machine adapted particularly for molding heel-piles consisting of lifts of rectangular form.

Other objects of the invention, and the features of construction by which the various objects are attained, will be set forth in connection with the following description of the preferred embodiment of the invention.

Figure 1:
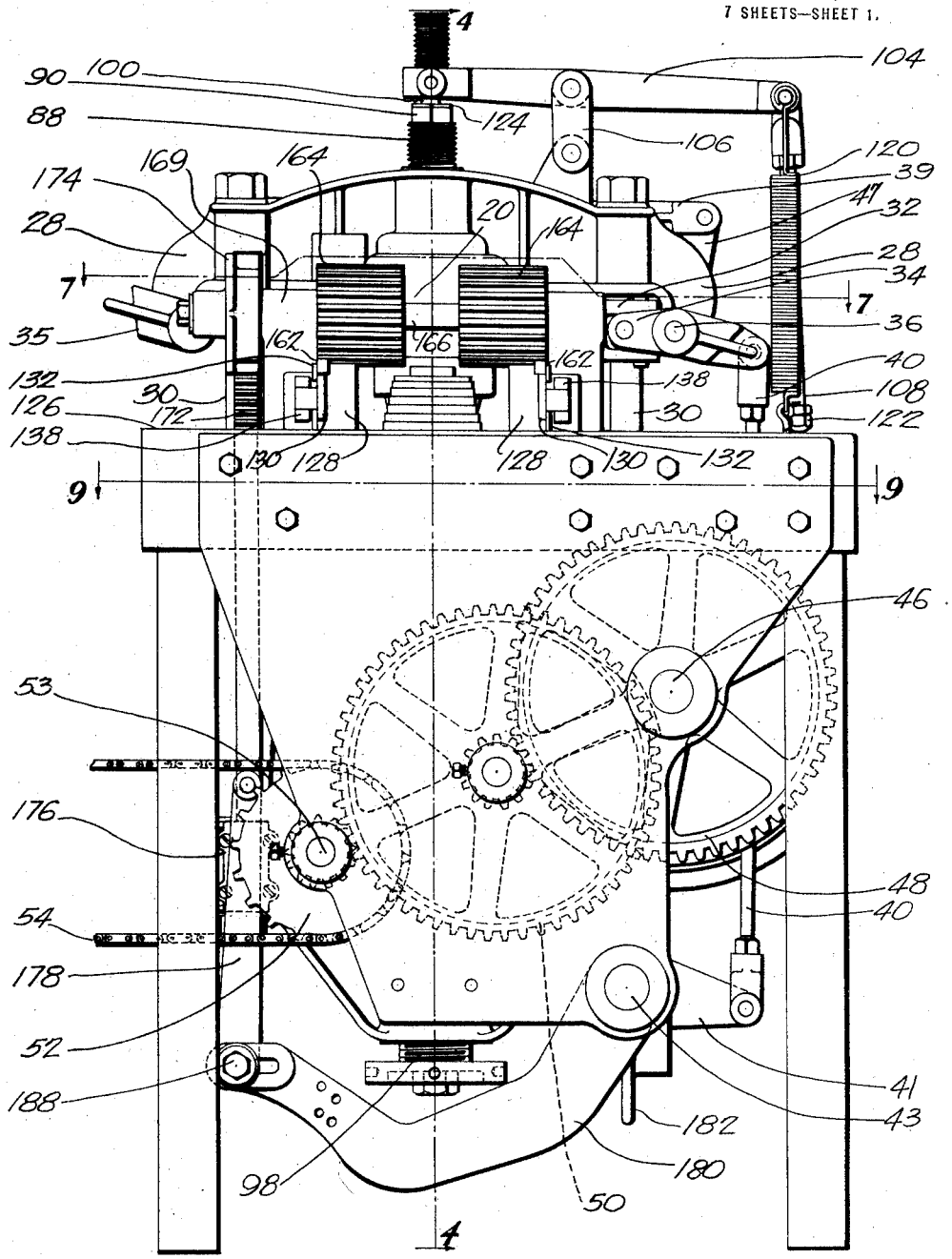
Figure 2:
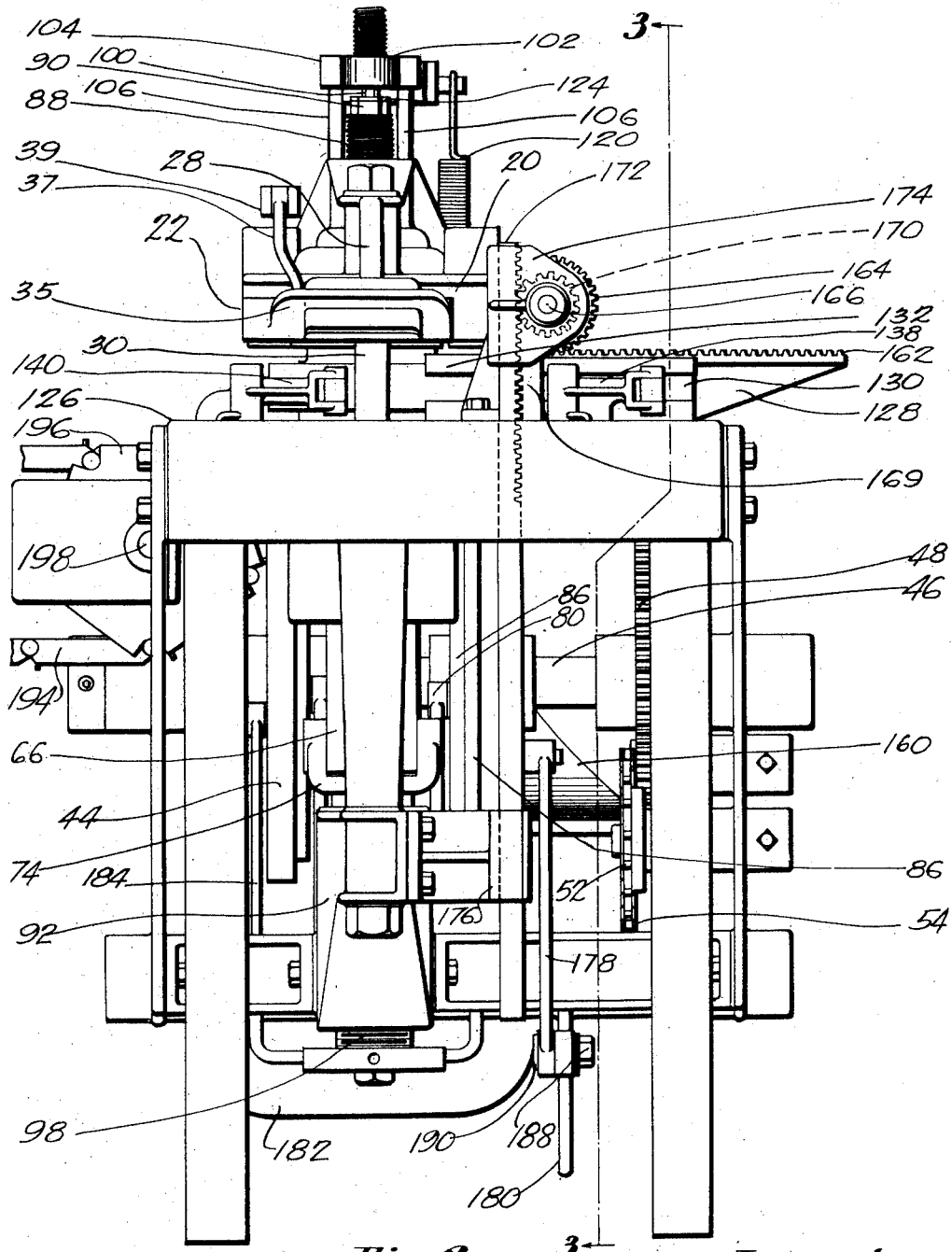
Figure 3:
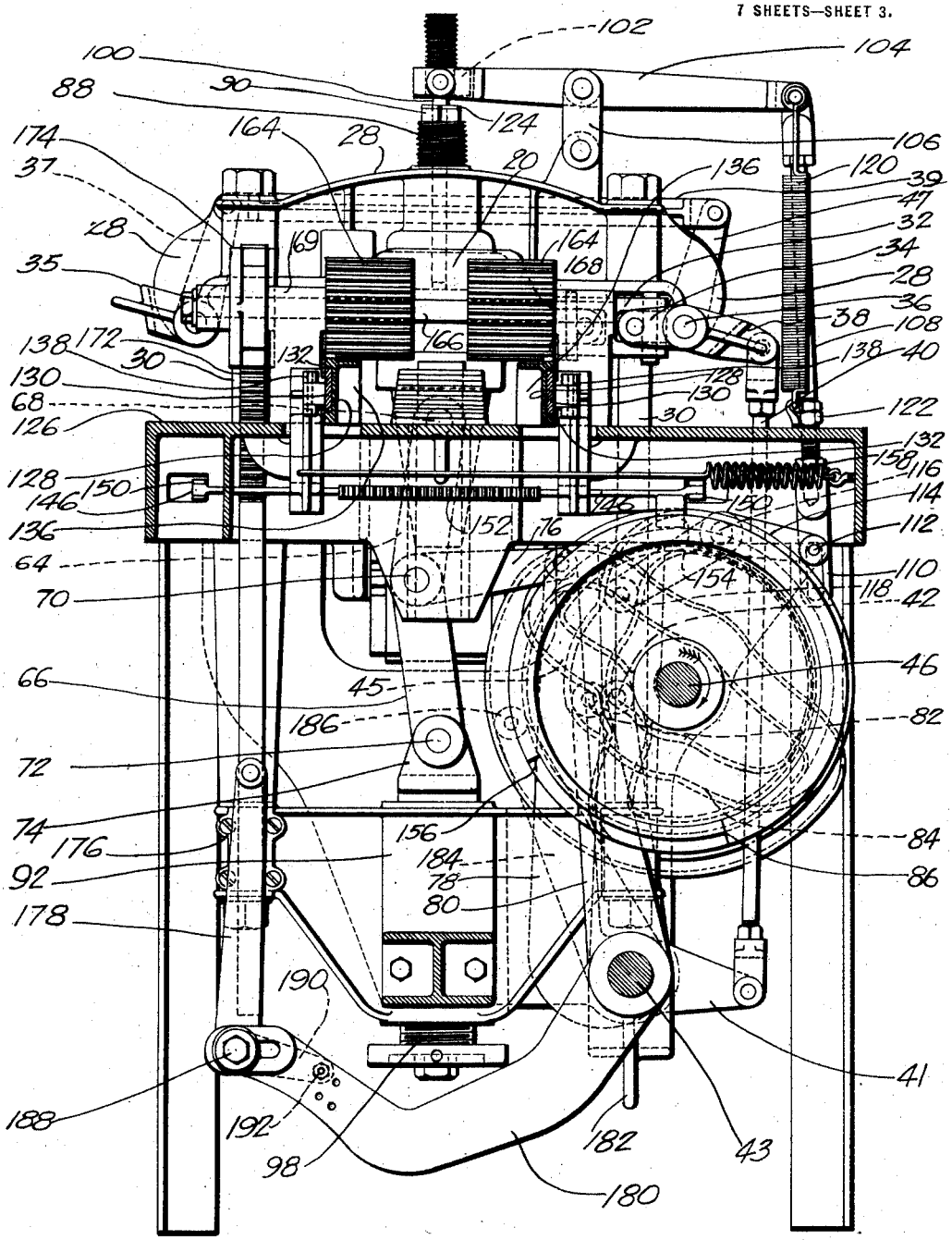
Figure 4:
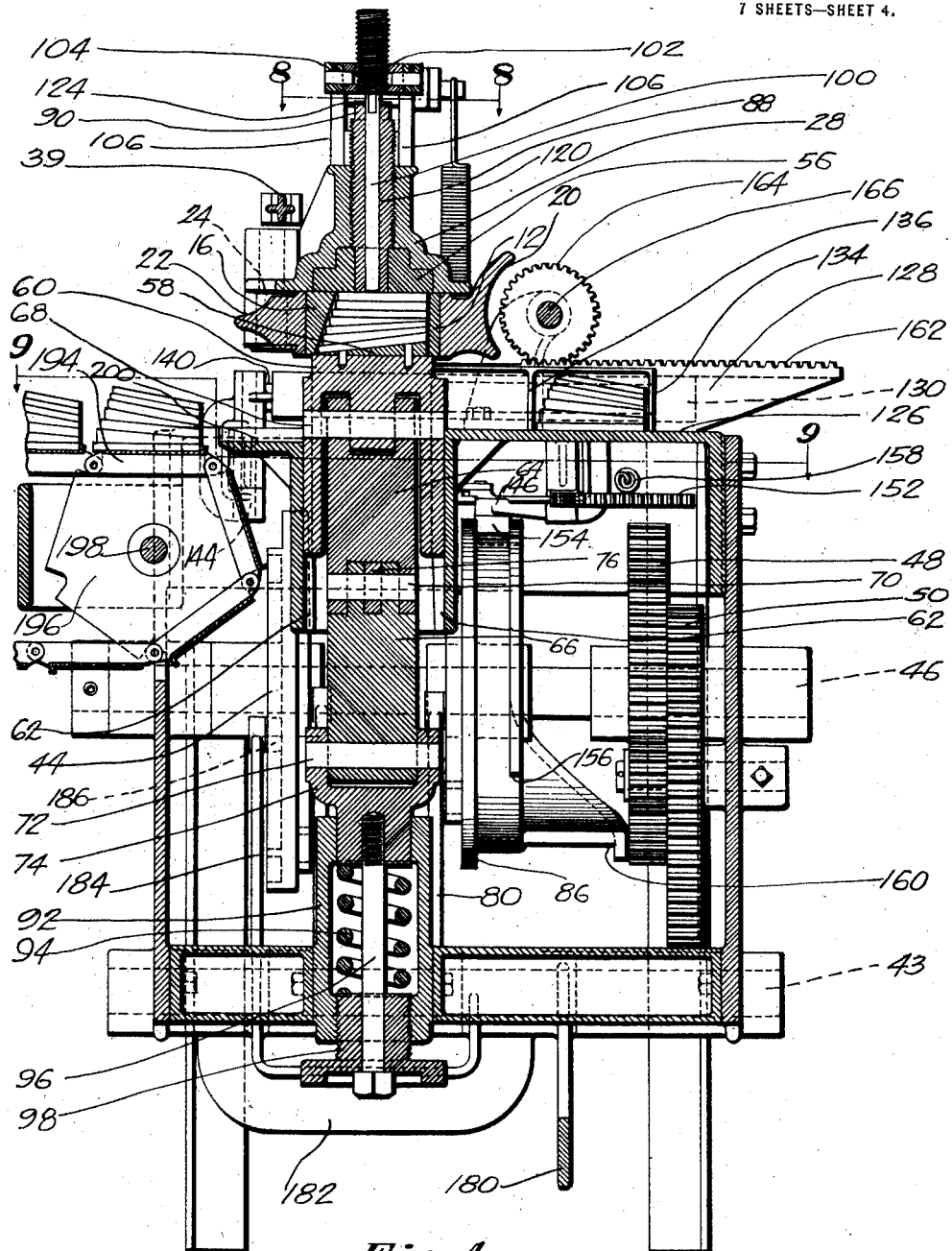
Figure 5:
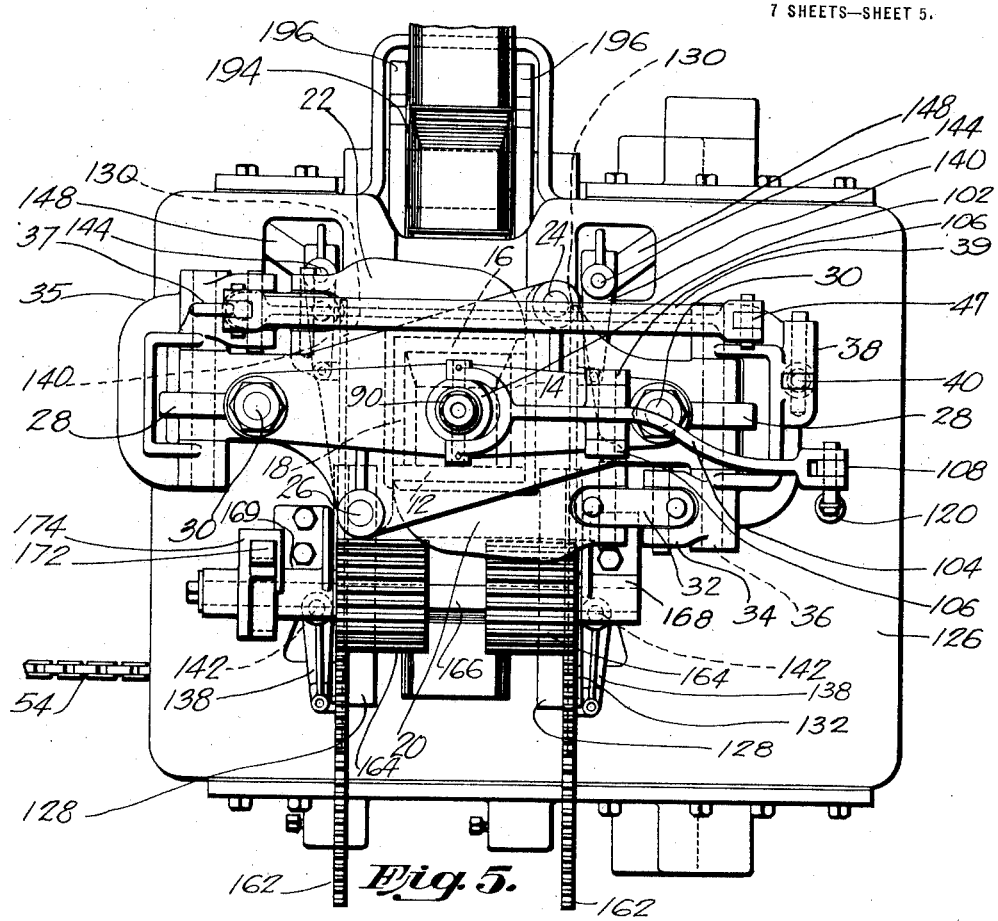
Figure 6:
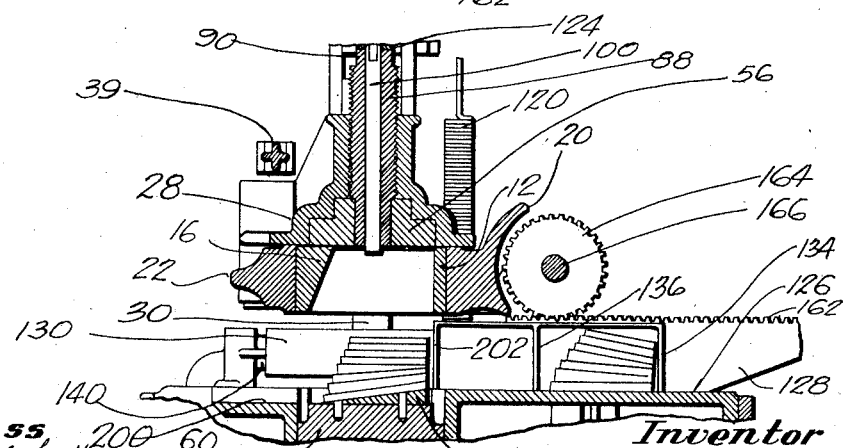
Figure 7:
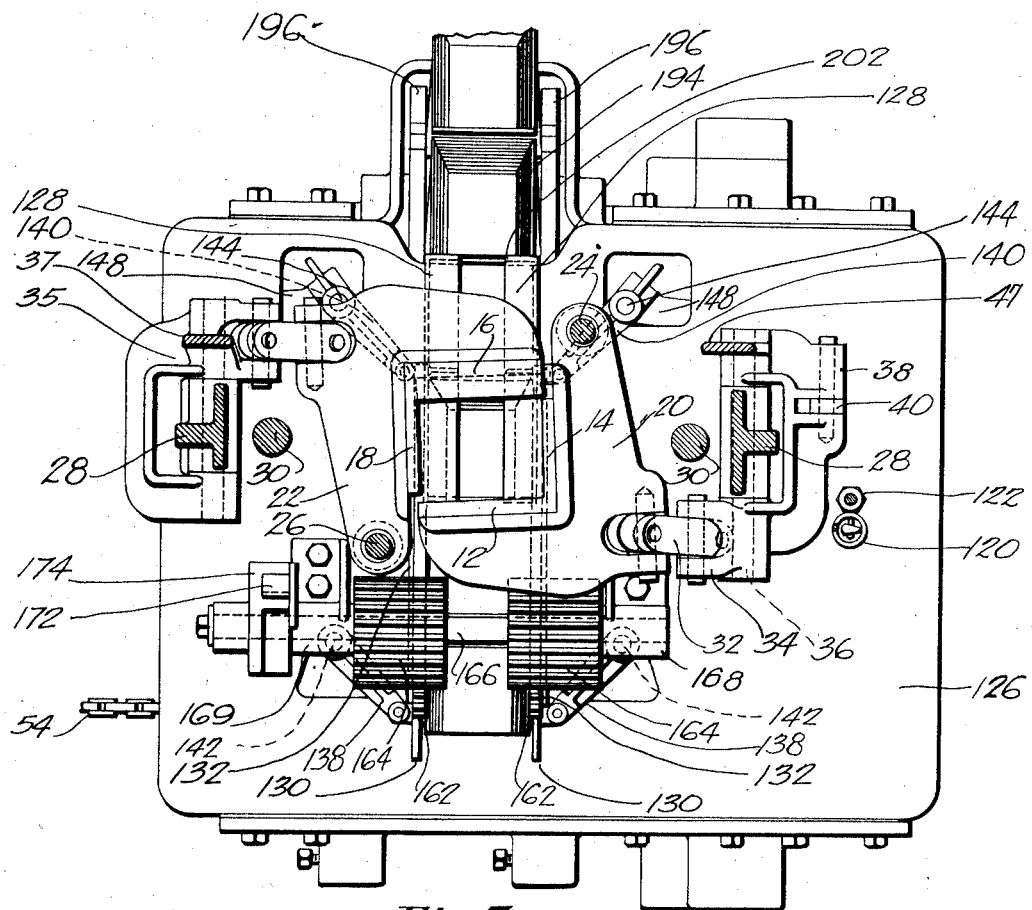
Figure 8:
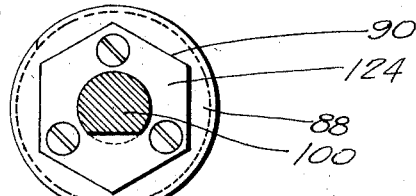

In the accompanying drawings Figure 1 is a front-elevation of a machine embodying the present invention; Fig. 2 is a side-elevation, looking from left to right in Fig. 1; Fig. 3 is a vertical section on the line 3—3 in Fig. 2; Fig. 4 is a vertical section on the line 4—4 in Fig. 1; Fig. 5 is a plan-view of the machine; Fig. 6 is a detail-view, similar to a portion of Fig. 4, but showing the parts in a different operative position; Fig. 7 is a plan-view, with some of the upper parts of the machine removed, in section approximately on the line 7—7 in Fig. 1; Fig. 8 is a detail-view, in section on the line 8—8 in Fig. 4, but on a much larger scale than the latter figure; Fig. 9 is a horizontal section, approximately on the line 9—9 in Fig. 1; and Fig. 10 is a rear-elevation of the upper parts of the machine.

The invention is shown as embodied in a machine in which a heel-pile, in inverted position, is introduced between upper and lower dies which press against its upper and lower surfaces, and between the two members of a mold which compresses the pile laterally.

Since the machine, as illustrated, is designed to operate upon heel-piles formed of rectangular lifts, each mold-member comprises two parts or walls arranged at a right angle to each other. One of the mold-members comprises parts 12 and 14, which are adapted to engage, respectively, the breast-surface and one of the lateral surfaces of the heel-pile (Figs. 6 and 7), and the other mold-member comprises parts 16 and 18, which are adapted to engage respectively, the rear surface and the other lateral surface of the heel-pile.

The mold-members are arranged to move toward and from each other approximately upon a diagonal line of the rectangular outlines of the heel-lifts. For this purpose the mold members are carried, respectively, by levers 20 and 22, which are arranged to swing about pivots 24 and 26. The levers have right-angular forms, as shown in Fig. 7, so as to embrace and support the mold-members, and the pivots depend from a stationary yoke 28. This yoke is fixed on the upper ends of vertical rods 30, which constitute parts of the stationary frame of the machine.

The mold-levers 20 and 22 are moved toward and from each other simultaneously and through equal distances, and for this purpose each of them is actuated by a toggle-mechanism capable of exerting a heavy pressure. The lever 20 is connected, through a universal joint, with one end of a toggle-link 32, the other member of the toggle being in the form of a lever-arm 34, also connected to the link by a universal joint. The lever 34 is mounted upon a horizontal pivot-rod 36, which is supported by one end of the yoke 28. The toggle is actuated by cam-mechanism, and for this purpose the yoke-shaped arm 38 of the toggle-lever is connected, by a vertical rod 40, with one arm 41 of a bell-crank cam-lever, which is mounted to turn on a rod 43 fixed in the frame of the machine. The other arm of the lever carries a roller 42, which engages a lateral cam-path 45 formed on one side of a cam-disk 44. The cam-disk is mounted on a cam-shaft 46, journaled horizontally in the frame of the machine, and this shaft is rotated constantly in the operation of the machine. For the purpose of rotating the shaft, a pinion 48, on one end, is connected, by reduction gearing 50, with a sprocket-wheel 52 which turns on a stud 53 fixed on the frame of the machine, and this sprocket-wheel is connected, by a chain 54, with a suitable source of power.

The mold-lever 22 is actuated by toggle-mechanism substantially similar to that which moves the lever 20, including a yoke-shaped lever-arm 35. An upwardly projecting lever-arm 37, integral with the arm 35, is connected, by a rod 39, with an arm 47 projecting upwardly from the toggle-lever 34, so that the two toggle-mechanisms move in unison, though one toggle moves to and from a position above its center-line, while the other moves to and from a position below its center-line (Fig. 10).

The dies which engage the upper and lower surfaces of the heel-piles are shown particularly in Figs. 4 and 6. The upper die 56 is supported by the frame-yoke 28, and its lower surface is contiguous with the upper edges of the mold-members. The lower die 58 is in the form of a thin plate or shim, which is secured, by dowels, upon the upper surface of a cross-head 60. The lower die moves into and out of the space between the mold-members, this movement being produced by sliding movements of the cross-head in vertical guideways 62 on the frame of the machine.

The cross-head is actuated by toggle-mechanism comprising two arms 64 and 66. The upper arm is connected with the cross-head by a pivot-pin 68. The arms are connected together by a pivot-pin 70, and the lower arm is connected, by a pivot-pin 72, with a stationary yoke 74.

The toggle is actuated by cam-mechanism. For this purpose a link 76 (Fig. 3) is pivoted, at one end, on the pin 70, while the other end of the link is pivoted to the upper end of a lever-arm 78 which turns on the rod 43. A second arm 80, integral with the hub of the arm 78, carries at its upper end a roller 82 which engages a cam-path 84 on one side of a cam-disk 86. This disk is mounted on and actuated by the cam-shaft 46, so that the lower die is actuated in timed relation with the movements of the mold-members.

The form and dimensions of the mold-members vary in accordance with the style and form of the heel-piles which are being acted upon, and accordingly it is necessary to adjust the upper die 56 vertically, so that it may meet the upper edges of the mold-members in all cases. For this purpose the die is fixed on the lower end of a stem 88 which is threaded into a vertical bore in the frame-yoke 28 (Fig. 4). The stem 88 has a hexagonal portion 90 at its upper end, by which it may be turned so as to screw it upwardly or downwardly and thus raise or lower the member 36. The die is shown in the drawings in its uppermost position, in which it is entirely housed in a recess in the yoke 28, but it may be moved downwardly into the space between the mold-levers whenever molds are used which are of less height than the space between these levers.

Owing to slight variations in the heights of the heel-piles upon which the machine is adjusted to operate, it is desirable that the movements of the cross-head 60, while performed with considerable force, shall not be positive. Accordingly, the yoke 74, to which the lower toggle-arm 66 is pivoted, is arranged to have a slight vertical movement in a housing 92 on the frame of the machine, and the yoke is supported by a powerful compression-spring 94 within the housing. A stem 96, fixed to the yoke 74, slides through a stop-sleeve 98, which is screwed into the lower end of the housing, and a head on the lower end of the stem limits the upward movement of the yoke by engagment with the lower end of the stop-sleeve. This sleeve may be adjusted upwardly or downwardly, to vary the distance to which the lower die 58 is introduced into the space between the mold-members.

When the heel-pile is molded, more or less paste may be upon the upper surface of the pile and may cause the pile to adhere to the upper die 56. In order to free the heel-pile from the die in such a case, so as to insure that the pile shall drop out of the mold, a clearer is used. This clearer comprises a rod 100 which slides through a central bore in the stem 88. The upper end of the rod is threaded into a block 102 which is pivoted in the forked end of a lever 104. This lever is fulcrumed upon two links 106 pivoted to a lug on the frame-yoke 28, and the outer end of the lever is pivoted to a depending rod 108. This rod is provided, at its lower end, with a slotted head 110 which embraces a pin 112 projecting from a cam-lever 114. The lever 114 is mounted on a pivot-stud 116 on the frame of the machine, and it carries a roller 118 which engages the cam-path 84. This cam-path is designed particularly with reference to the actuation of the lower die, as before stated, but it is employed, for convenience, to actuate the clearer also. Since it provides, however, for a greater amplitude of movement than is necessary in the clearer, the lost-motion connection comprising the pin 112 and the slotted member 110 is employed. A tension-spring 120, attached to the outer end of the lever 104, normally holds the clearer in raised position, a stop-nut 122 on the rod 108 being in engagement, at this time, with the upper surface of the table 126 of the machine, through which the rod 108 passes. At a suitable time in the cycle of operations, the cam-lever 114 acts to swing the lever 104 and thus depresses the clearer-rod 100 a short distance below the lower surface of the upper die 58.

In order to adjust the movements of the clearer coincidently with the adjustment of the upper die 56, the clearer-rod is formed with a flat side, as shown in Fig. 8, and it passes through a correspondingly formed opening in a plate 124 fixed on the upper end of the stem 88. In consequence of this arrangement, when the stem is rotated, the clearer-rod also is rotated, and since the upper end of the rod is threaded with the same pitch as the stem 88, it results that the clearer-rod is adjusted upwardly or downwardly to the same degree as the die, so as always to project the same distance below the die when actuated by the mechanism before described.

The machine is provided with means by which the heel-piles are automatically fed into and removed from the mold. These means comprise two parallel feed-slides 128 extending horizontally above the table 126. Each slide comprises a vertical plate which moves against the inner surface of a flat guide-bar 130, and the slide is provided with flanges 132 which overhang the upper and lower margins of the bar so as to guide the slide thereon.

The two feed-slides are provided with inwardly-projecting flanges 134 and 136, adapted to engage and partly inclose a heel-pile during the feeding-operation. In order that these flanges may first engage and then release a heel-pile, the feed-slides are moved toward and from each other. For this purpose each guide-bar 130 is pivoted, near its front and rear ends, to two arms 138 and 140, respectively, and these arms are pivoted on two rods 142 and 144 fixed vertically in the frame of the machine. Below the table 126 are arms 146 and 148, which are connected integrally with the arms 138 and 140, respectively, by means of yoke-shaped connections, and the arms 146 and 148 are connected by rods 150. In consequence of this arrangement, the arms 138 and 140 are always caused to rock through equal angles, so as to hold the guide-bars 130 always in parallel position.

In order that the guide-bars may have equal positive movements, the two arms 138 are formed integral with segmental gears 152 which are located below the table and mesh together. Cam-mechanism is employed to actuate the parts just described, and for this purpose one of the arms 146 is provided with a roller 154 which engages a peripheral path on the cam 86. This path comprises, throughout most of its extent, two continuous walls, but one of these walls is broken away at the point 156 (Fig. 4) so as to release the roller 154, and when this occurs a spring 158, attached to one of the segmental gears 152 (Fig. 9), acts to rock the gears in a direction to cause the guide-bars 130 to be moved toward each other. This movement is arrested by engagement of the feed-slides with the lateral surfaces of the heel-pile which is to be fed. By the continued rotation of the cam 86, an inclined part 160 is brought into engagement with the roller 154, thus returning this roller, from whatever position it may have been moved to by the spring 158, to the normal position shown in Fig. 9, thereby separating the feed-slides again after a due interval.

While the feed-slides are in engagement with a heel-pile, they are advanced to bring this heel-pile into position upon the upper surface of the lower die 58. For this purpose the feed-slides are both provided, on their upper surfaces, with rack-teeth 162, which mesh with pinions 164 fixed on a horizontal shaft 166. This shaft is arranged transversely of the slide, and it turns in bearings in brackets 168 and 169 rising from the table 126. The shaft 166 is rotated first in one direction to advance these slides, and then in the opposite direction to retract them. For this purpose it is provided, at one end, with a pinion 170 (dotted lines in Fig. 2) which meshes with rack-teeth formed in a vertical slide-rod 172. This rod is guided, at its upper end, in a bearing 174 on the bracket 169, while its lower portion slides in a bearing 176 on the frame of the machine. A link 178 connects the slide-rod with a lever-arm 180 (Fig. 3), which turns freely on the shaft 43. By means of an integral yoke 182, the lever-arm is connected with an arm 184 which carries a roller 186 on its upper end. This roller engages a path formed in the side of the cam 44. The cams 44 and 86 are so timed as to cause the feed-slides to advance while they are held in position to engage a heel-pile, then to move away from each other so as to release the heel-pile, then to retract while still separated, and finally to approach each other again after the operator of the machine has placed a heel-pile upon the table between the flanges 134 and 136.

The length of the advancing and retracting movements which it is necessary to impart to the slides depends upon the size or length of the heel-pile to be operated on, and these movements are therefore adjustable.

For this purpose the link 178 is connected with the lever arm 180 by means of a stud 188 movable in a slot in the arm (Fig. 3). By moving the stud to different positions in the slot, the effective length of the arm may be changed, so as to vary the length of the movement of the slide-rod 172, through which the slides are actuated. To retain the stud in adjusted position, it is connected with one end of a link 190, of which the other end is secured to the lever-arm 180 by means of a bolt 192. Several holes are provided to receive the bolt, these holes corresponding to the various adjustments of the studs in the slot.

The illustrated machine is designed to be employed as part of a system in which the heel-piles, or partly formed heels, are conveyed from one machine to another by means of an endless conveyer. It is accordingly shown as arranged to discharge the molded heel-piles upon such conveyer. As shown in Fig. 4, the conveyer comprises a series of links 194, which are pivotally connected together, upon each of which a heel-pile may be deposited, and this conveyer passes around idler-wheels 196 mounted to turn on a stationary shaft 198 at the rear of the machine. Adjacent to the foremost link on the upper stretch of the conveyer is a horizontal discharge-table 200, just in the rear of the position occupied by the lower die 58 when the latter is in its lowermost position. This is the position occupied at the moment when the feed-slides convey a fresh heel-pile to the die. At this time the feed-slides act also to expel the molded heel-pile from the die, across the discharge-table 200 and on to the conveyer-link just referred to. For this purpose the feed-slides are extended to a sufficient length beyond the flange 136, and are provided with flanges 202, at their rear extremities, which engage the breast-surface of the molded heel-pile and push it on to the conveyer, as shown in Fig. 6.

The molds 14 and 16 are secured removably in place in the mold-levers 20 and 22 by any convenient means, so that they may be removed and replaced by others, according to the size and shape of the heel-piles to be molded. In this way the machine may be adapted to operate, not only upon heel-piles of different lengths and heights, but also upon those which are built up either of graded lifts, as shown in the drawings, or of lifts of uniform size throughout. The lower die 58 is shown as tapered in form, to adapt the machine to operate upon heel-piles including one or more wedge lifts, and this die, since it is secured in place merely by dowels, may be readily removed and replaced by another, of either tapered or plain form according to the character of the heel-pile.

An important feature of the machine resides in the timing of the dies and molding instrumentalities. This is so arranged that a heel-pile is first raised by the lower die into position between the molds, the molds are then brought into their final position, thus subjecting the heel-lifts to whatever lateral pressure may be necessary to aline or arrange them exactly according to the required contour of the heel, and thereafter the rising movement of the lower die is continued and completed, so as to subject the pile to the vertical pressure whereby its constituent lifts are brought firmly together, and the adhesion of the cement is assured.

This timing of the parts is secured by a suitable formation of the cams by which they are actuated, and the forms of these cams are indicated in dotted lines in Fig. 3. As shown in that figure the cam 84, rotating in the direction of the arrow and acting upon the roller 82, causes first a movement of the roller from left to right for the greater part of its range of operation, whereby the toggle by which the lower die is actuated is nearly, but not quite, straightened, thus elevating the heel-pile into position betwen the molds, but not subjecting it to any vertical pressure. While this movement of the lower die is occurring, the cam 45, acting upon the roller 42, moves the latter from left to right, thus closing together the molds, and this movement is completed while the roller 82 is still stationary in its intermediate position. The roller 42 then, in turn, remains stationary while the roller 82 completes a further and final movement from left to right, thereby causing the lower die to subject the heel-pile to vertical compression. This compression is then maintained until the cam 45 has moved the molds outwardly again. In this way the heel-pile is held firmly while the molds are disengaged from it, so that any adhesion between the molds and the heel-pile, which may be caused by surplus cement at the edges of the heel-pile, is broken, and the heel-pile is thus prevented from adhering to either of the molds when the lower die descends. Adhesion between the heel-pile and the upper die 56 is broken by the action of the clearer 100, as before described, while any adhesion between the heel-pile and the lower die is broken by the action of the feed-slides in discharging the pile.

While the invention has been described as embodied in a machine adapted for the specific operation of molding a freshly formed heel-pile, it will be apparent that it may be applicable to machines of other kinds for compressing heels, or the partly manufactured elements thereof, at various stages in their manufacture, and that the invention is not, in general, limited to the embodiment thereof hereinbefore described and illustrated in the accompanying drawings.

What is claimed as new, is:

1. A machine for molding heel-piles having, in combination, a side-mold comprising two side walls arranged at an angle to each other; and mechanism for closing said mold against the work by movement substantially in the direction of the bisector of said angle.

2. A machine for molding heel-piles having, in combination, two side-molds arranged to form a parallelogram, each comprising two walls arranged substantially at a right-angle to each other; and mechanism for closing said molds against the work by movement substantially in the direction of a diagonal of the parallelogram defined by the molds.

3. A machine for molding heel-piles having, in combination, a stationary upper die and a coöperating movable lower die for respectively engaging the upper and lower surfaces of a heel-pile; and plurality of side molds mounted independently of said lower die for engaging the lateral surfaces of the heel-pile; and power operated mechanism for successively and automatically causing the side molds to laterally aline the component lifts of the heel-pile, and then causing the lower die to raise the heel-pile into compressing engagement with the upper die.

4. A machine for molding heel-piles having, in combination, a die; a clearer for disengaging work from the die; mechanism for advancing the clearer a predetermined distance from the face of the die; and means for adjusting the position of the die and for simultaneously and equally adjusting the position of the clearer so as to maintain a constant relation of the die and the clearer.

5. A machine for molding heel-piles having, in combination, a side-mold; a die; means for moving the die upwardly and downwardly toward and from the mold; and transversely movable means mounted independently of said die for moving a molded heel-pile from and feeding a fresh heel-pile to, the face of the die when the die is in its lowered position.

6. A machine for molding heel-piles having, in combination, a mold; a die; means for moving the die upwardly and downwardly toward and from the mold; a clearer for forcing a molded heel-pile downwardly, to cause it to follow said die in its downward motion; and transversely movable means mounted independently of said die for removing the molded heel-pile from, and feeding a fresh heel-pile to, the face of the die when the die is in its lowered position.

7. A machine for molding heel-piles having, in combination, molding instrumentalities; a feed-table; and means, for feeding a heel-pile resting on the feed-table, comprising two parallel slide-guides; two slides mounted on the guides and provided with members for engaging the heel-pile; means for moving the slide-guides toward each other to cause engagement of the heel-pile; and means for moving the slides along the guides to advance the heel-pile so engaged.

8. A machine for molding heel-piles having, in combination, molds for engaging the lateral surfaces of a heel-pile; dies for engaging the upper and lower surfaces of the heel-pile; and mechanism, for actuating the molds and the dies, constructed and arranged to maintain the pressure of the dies against the heel-pile while disengaging the molds therefrom, and thereafter to move one die away from the other.

9. A machine for molding heel-piles having, in combination, molds for engaging the lateral surfaces of a heel-pile; dies for engaging the upper and lower surfaces of the heel-pile; mechanism for actuating the molds and the dies; constructed and arranged to maintain the pressure of the dies against the heel-pile while disengaging the molds therefrom and thereafter to move one of the dies away from the other; and a clearer associated with one of the dies and operating to disengage the heel-pile therefrom during said movement of one of the dies from the other.

10. A machine for molding heel-piles having, in combination, a side-mold comprising two angularly arranged side walls adapted to engage the entire corresponding lateral surfaces of the heel-pile; and means for advancing said mold into full engagement with said surfaces by movement in the general direction of the bisector of the angle between the side walls.

11. A machine for molding heel-piles having, in combination, a mold; a die; means for vertically reciprocating the die to and from said mold; and single means mounted independently of said die and acting when the die is in its lowered position for ejecting a molded heel-pile from said die and substituting a fresh heel-pile in its place.

12. A machine for molding heel-piles having, in combination, a stationary feed-table; a mold above said feed-table; a reciprocating member movable from a position in the plane of the table toward said mold for raising a heel-pile thereto; and means mounted on said table and acting when the member is lowered into the plane of the table for removing a molded heel-pile from said member and substituting a fresh one in its place.

13. A machine for molding heel-piles having, in combination, molding instrumentalities; a stationary feed-table; means for raising a heel-pile from the plane of the table to said molding instrumentalities; and automatic means acting when the raising member is lowered for grasping a heel-pile resting upon said table, feeding it to and depositing it upon said raising member.

14. A machine for molding heel-piles having, in combination, molding instrumentalities; a stationary feed-table; means for raising a heel-pile from the plane of the table to said molding instrumentalities; and means acting when said raising member supports a molded heel-pile in the plane of the table for grasping said heel-pile together with a fresh heel-pile resting upon said table, removing the molded heel-pile from the raising member, substituting the fresh heel-pile therefor, and subsequently releasing both heel-piles.

15. A machine for molding heel-piles having, in combination, relatively movable upper and lower pressing dies; relatively movable complemental side-molds for alining the component lifts of the heel-pile, said side-molds being mounted independently of said dies; means for causing the lower die to raise a heel-pile into operative position within said side molds, means for causing the side-molds to aline said heel-pile; and means for thereafter causing said dies to press said heel-pile.

16. A machine for molding heel-piles having, in combination, relatively movable pressing dies; relatively movable complemental side-molds; and means for causing the side-molds to aline the component lifts of a heel-pile and subsequently to press the pile during the working period of the machine, and for effecting the release of the side-molds before the pressing dies are released during the remainder of the cycle of operation.

17. A machine for molding heel-piles having, in combination, side-molds for alining the component lifts of a heel-pile; relatively movable pressing dies for engaging the upper and lower surfaces thereof, means for actuating said side-molds; and spring-cushioned operating mechanism for actuating one of said dies to subject the heel-pile to molding pressure.

18. A machine for molding heel-piles having, in combination, side-molds for alining the component lifts of a heel-pile; relatively movable pressing dies for engaging the upper and lower surfaces thereof; means for actuating said side molds; an operating toggle for acctuating one of said dies to subject the heel-pile to pressure, and yielding means associated with said toggle to determine the pressure placed upon the heel-pile.

19. A machine for molding heel-piles having, in combination, side-molds for alining the component lifts of a heel-pile; relatively movable pressing dies for engaging the upper and lower surfaces thereof; means for actuating said side-molds; an operating toggle for actuating one of said dies to subject the heel-pile to pressure; yielding means associated with said toggle to determine the pressure placed upon the heel-pile; and adjustable means for determining the ultimate working movement of the toggle-operated die.

20. A machine for molding heel-piles having, in combination, molding means; a stationary feed-table; a molding member, means for actuating said member to raise a heel-pile from the plane of the table to said molding means and to apply molding pressure to the heel-pile; and means acting when the molding member occupies a position in the plane of the table for feeding a heel-pile from said table upon said molding member.

21. A machine for molding heel-piles having, in combination, upper and lower dies for applying pressure to said heel-piles, side molds independently mounted between said dies for engaging and laterally alining the lateral surfaces of the heel-piles, and automatic means for successively raising the lower die to bring the heel-pile thereon into working relation with said side molds, actuating the side molds to aline the component lifts of the heel-pile, and raising the lower die further to engage the alined heel-pile thereon with the upper die and subject it to pressure.

22. A machine for molding heel-piles having, in combination, molding means for engaging the tread-face, breast and lateral surfaces of a heel-pile, a movable pressing die for engaging the heel-seat of the heel-pile, a toggle for actuating said pressing die to subject the heel-pile confined within said molding means to molding pressure, and spring-cushioned means against which the lower end of said actuating toggle operates to determine the pressure placed upon the heel-pile.

ERASTUS E. WINKLEY.